(12) United States Patent
Balan

(10) Patent No.: US 11,209,373 B2
(45) Date of Patent: Dec. 28, 2021

(54) SIX DEGREE OF FREEDOM WORKPIECE STAGE

(71) Applicant: KLA Corporation, Milpitas, CA (US)

(72) Inventor: Aviv Balan, Mountain View, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 16/902,640

(22) Filed: Jun. 16, 2020

(65) Prior Publication Data

US 2020/0400588 A1 Dec. 24, 2020

Related U.S. Application Data

(60) Provisional application No. 62/864,678, filed on Jun. 21, 2019, provisional application No. 62/879,011, filed on Jul. 26, 2019.

(51) Int. Cl.
*G03B 27/58* (2006.01)
*G01N 21/95* (2006.01)

(52) U.S. Cl.
CPC ..... *G01N 21/9501* (2013.01); *G01N 2201/02* (2013.01); *G01N 2201/0636* (2013.01); *G01N 2201/06113* (2013.01)

(58) Field of Classification Search
CPC ....... G01N 2201/02; G01N 2201/0636; G01N 21/9501; G01N 2201/06113; G03B 27/58
USPC ......................................................... 356/450
See application file for complete search history.

(56) References Cited

U.S. PATENT DOCUMENTS

| | | | | |
|---|---|---|---|---|
| 6,486,941 | B1* | 11/2002 | Hazelton | G03F 7/70716 355/53 |
| 7,288,859 | B2* | 10/2007 | Hazelton | G03F 7/70716 310/12.04 |
| 7,468,783 | B2* | 12/2008 | Nishimura | G03B 27/62 310/12.06 |
| 8,970,820 | B2 | 3/2015 | Shibazaki | |
| 9,835,958 | B2 | 12/2017 | Shibazaki | |
| 2003/0030782 | A1 | 2/2003 | Watson et al. | |
| 2004/0119964 | A1* | 6/2004 | Poon | G03F 7/709 355/72 |
| 2005/0168076 | A1* | 8/2005 | Hazelton | G03F 7/70716 310/12.04 |

(Continued)

FOREIGN PATENT DOCUMENTS

| CN | 101551598 A | 10/2009 |
|---|---|---|
| CN | 104238275 A | 12/2014 |

(Continued)

OTHER PUBLICATIONS

Jywe et al., "Development of a middle-range six-degrees-of-freedom system," Proceedings of the Institution of Mechanical Engineers Part B Journal of Engineering Manufacture, Apr. 2010, pp. 679-688.

(Continued)

*Primary Examiner* — Roy M Punnoose
(74) *Attorney, Agent, or Firm* — Hodgson Russ LLP

(57) ABSTRACT

A second stage is disposed on the first stage. The second stage provides six degrees of freedom. A chuck that holds a workpiece is disposed on the second stage. Actuators that enable movement in three directions are disposed on the second stage. The first stage and the second stage move independent of each other during inspection of the workpiece on the chuck.

16 Claims, 5 Drawing Sheets

(56) References Cited

U.S. PATENT DOCUMENTS

| | | | |
|---|---|---|---|
| 2005/0218842 A1* | 10/2005 | Yang | G03F 7/70716 318/114 |
| 2006/0061218 A1* | 3/2006 | Hazelton | G03F 7/70725 310/12.06 |
| 2006/0061751 A1* | 3/2006 | Teng | G03F 7/70716 355/72 |
| 2007/0236854 A1* | 10/2007 | Lee | G03F 7/709 361/143 |
| 2007/0268475 A1* | 11/2007 | Binnard | G03F 7/70725 355/72 |
| 2013/0038853 A1 | 2/2013 | Zhu et al. | |
| 2013/0176548 A1 | 7/2013 | Harb et al. | |
| 2016/0097980 A1* | 4/2016 | Shibazaki | G03F 7/70775 355/67 |
| 2018/0081283 A1 | 3/2018 | Yasuda et al. | |
| 2018/0108559 A1 | 4/2018 | Balan et al. | |
| 2018/0136566 A1* | 5/2018 | Shibazaki | G03F 7/70133 |
| 2019/0155175 A1* | 5/2019 | Shibazaki | G03F 7/70641 |

FOREIGN PATENT DOCUMENTS

| | | |
|---|---|---|
| JP | 2002057099 A | 2/2002 |
| JP | 2012522373 A | 9/2012 |
| JP | 2017062490 A | 3/2017 |
| KR | 20190010138 A | 1/2019 |

OTHER PUBLICATIONS

WIPO, ISR for International Application PCT/US2020/038582, Oct. 5, 2020.

\* cited by examiner

SIX DEGREE OF FREEDOM WORKPIECE STAGE

CROSS-REFERENCE TO RELATED APPLICATIONS

This application claims priority to the provisional patent application filed Jun. 21, 2019 and assigned U.S. App. No. 62/864,678 and the provisional patent application filed Jul. 26, 2019 and assigned U.S. App. No. 62/879,011, the disclosures of which are hereby incorporated by reference.

FIELD OF THE DISCLOSURE

This disclosure relates to positioning a workpiece on a stage, such as in a semiconductor inspection tool.

BACKGROUND OF THE DISCLOSURE

The semiconductor manufacturing industry uses complex techniques for fabricating integrating circuits with semiconductor materials that are layered and patterned onto a wafer, such as a silicon wafer. An integrated circuit is typically fabricated from a plurality of reticles. Generation of reticles and subsequent optical inspection of such reticles have become standard steps in the production of semiconductors. The fabrication of semiconductor devices, such as logic and memory devices, typically includes processing a semiconductor wafer using a large number of semiconductor fabrication processes with multiple reticles to form various features and multiple levels of the semiconductor devices. Multiple semiconductor devices may be fabricated in an arrangement on a single semiconductor wafer and then separated into individual semiconductor devices. The wafer position with respect to the reticle affects fabrication results.

After a wafer is fabricated, it may be inspected for defects or certain features of the wafer may be measured. Likewise, reticles may be inspected and reticle features measured. Lithography and inspection systems need accurate positioning and position detection systems.

Previous high vacuum systems had a coarse stage with position feedback for the chuck that used a mirror plate mounted on the stage. Any small move required moving the entire heavy stage instead of moving just the wafer chuck. Moving the heavy mass stage for small moves creates vibrations, generates heat, needs to overcome the ball bearing friction, and takes a substantial amount of time to settle to desired position. Moving the heavy mass stage also generates jitter from the ball bearing during constant velocity swath.

Therefore, improved systems and methods of operation are needed.

BRIEF SUMMARY OF THE DISCLOSURE

A system is provided in a first embodiment. The system includes a first stage configured to move in at least an X-direction and a perpendicular Y-direction; a second stage disposed on the first stage that provides six degrees of freedom; and a chuck disposed on the second stage. The chuck is configured to hold a workpiece. At least one X-direction actuator is configured to move the second stage in the X-direction. The X-direction actuator is disposed on the second stage. At least one Y-direction actuator is configured to move the second stage in the Y-direction. The Y-direction actuator is disposed on the second stage. At least one Z-direction actuator configured to move the second stage in a Z-direction. The Z-direction actuator is disposed on the second stage. The Z-direction is perpendicular to both the X-direction and the Y-direction. Two interferometer mirrors are disposed on perpendicular edges of the second stage. At least one vertical position feedback sensor is disposed on the second stage. At least one counterbalance spring is disposed between the first stage and the second stage.

The first stage can have a wider range of movement than the second stage.

The system can include four of the Z-direction actuators disposed on the second stage.

The system can include two of the Y-direction actuators disposed on the second stage.

The system can further include a base plate. The first stage is disposed on the base plate.

The system can further comprise two laser interferometers. Each of the laser interferometers directs a laser at one of the interferometer mirrors.

The workpiece may be a semiconductor wafer or a reticle.

The system can further comprise a semiconductor inspection system configured to direct a beam at the chuck.

The system can further comprise a processor configured to send instructions for movement of the first stage and the second stage relative to each other. The processor is in electronic communication with the X-direction actuator, the Y-direction actuator, the Z-direction actuator, and the vertical position feedback sensor.

A method is provided in a second embodiment. The method comprises providing a system that includes a first stage, a second stage disposed on the first stage, and a chuck disposed on the second stage. The first stage is configured to move in at least an X-direction and a perpendicular Y-direction. The second stage provides six degrees of freedom. A workpiece is disposed on the chuck. The workpiece is a semiconductor wafer or a reticle. The first stage and the second stage are moved independent of each other. The workpiece is inspected on the chuck.

Moving the second stage can include moving the second stage in the X-direction using at least one X-direction actuator disposed on the second stage.

Moving the second stage can include moving the second stage in the Y-direction using at least one Y-direction actuator disposed on the second stage.

Moving the second stage can include moving the second stage in a Z-direction using at least one Z-direction actuator disposed on the second stage. The Z-direction is perpendicular to both the X-direction and the Y-direction.

The method can further include determining a position of the second stage in the X-direction using a laser interferometer. The laser is directed at a mirror disposed on the second stage.

The method can further include determining a position of the second stage in the Y-direction using a laser interferometer. The laser is directed at a mirror disposed on the second stage.

The method can further include determining a position of the second stage in a Z-direction using a vertical position feedback sensor disposed on the second stage.

The method can further include, using a processor, sending instructions for the moving.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Semiconductor manufacturers need a stage with fine movement capability that moves in the X-direction, Y-direction, Z-direction, pitch, roll, and rotation (i.e., yaw). Embodiments disclosed herein provide this movement capability. Embodiments disclosed herein also can quickly settle into position and cancel any residual vibration. A stage with fine movement capability is placed on top of a coarse X-Y stage. This design can be used in a high vacuum application where laser interferometer feedback operates.

A fine, short-stroke stage can be used. A wafer or reticle is placed on the fine, short-stroke stage. The fine, short-stroke stage can be guided by flexures or can float mechanically unguided. This fine, short-stroke stage can have five or six degrees of freedom (DOF) with position sensors feedback and/or laser interferometer feedback to allow for real time position tracking or vibration cancelation. This can provide larger throughput, fast settling time, or low jitter scanning because the moving mass is low and is decoupled from the floor. Lower jitter during constant velocity can meet sensitivity in high vacuum systems, which can enable use of a laser interferometer for chuck position feedback. Movement in the Z-direction, pitch, and roll actuators or feedback is not connected with the coarse X-Y stage.

Figure 1:
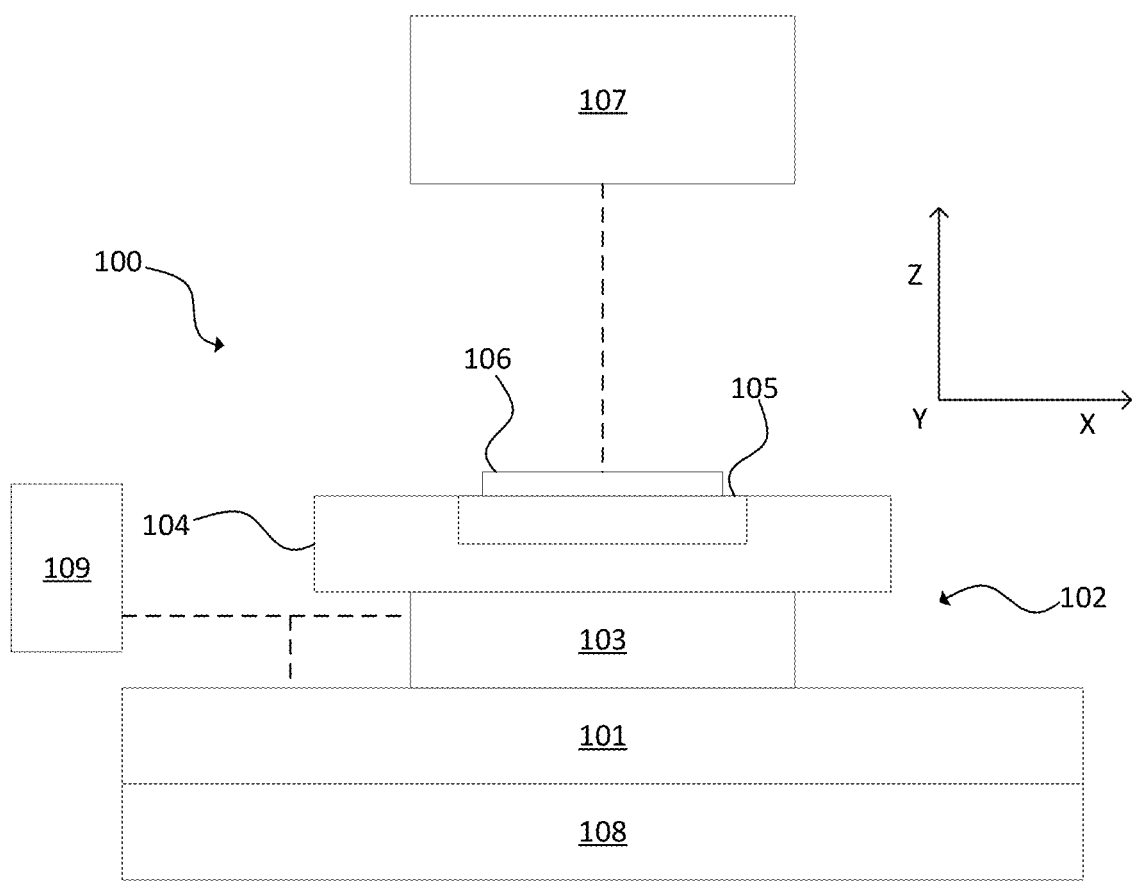
FIG. 1 is a cross-sectional side view of a system in accordance with the present disclosure.

FIG. 1 is a cross-sectional side view of a system 100. The system 100 includes a first stage 101 that is configured to move in at least an X-direction and a perpendicular Y-direction. A second stage 102 is disposed on the first stage 101. The second stage 102 provides six DOF and can move in the X-direction, Y-direction, and Z-direction. The second stage 102 includes the base 103 and frame 104. The frame 104 can support a chuck 105. The base 103 can be disposed on the first stage 101 and can support some or all of the actuators for the second stage 102. The first stage 101 can be referred to as a coarse stage and the second stage 102 can be referred to as a fine stage.

The second stage 102 can float on an external frame using its actuators. It may not be carried by the first stage 101 in a rigid manner. The magnetic field of the actuators and the position sensor can keep the relationship between the second stage 102 and the first stage 101 within a certain threshold or target.

A chuck 105 is disposed on the second stage 102. While disposed in the frame 104 in FIG. 1, the chuck 105 can be positioned on an upper surface of the frame 104. A workpiece 106, such as a semiconductor wafer or reticle, can be held by the chuck 105. A semiconductor inspection system 107 can be configured to direct a beam at the chuck 105. The beam can be a photon, ion, or electron beam.

The first stage 101 can be disposed on a base plate 108, as shown in FIG. 1. The first stage 101 also can hang from a bridge.

The first stage 101 can have a wider range of movement than the second stage 102. For example, the second stage 102 may have a range of motion that is less than 50%, less than 25%, less than 20%, less than 15%, or less than 10% the range of motion of the first stage 101.

Magnetic levitation can be activated when the system 100 is operational so the second stage 102 does not contact hard stops. The magnetic levitation can begin during initialization. With magnetic levitation, the second stage 102 will initialize first and the first stage 101 will initialize second.

In another embodiment, the system 100 is not a magnetic levitation stage.

A processor 109 can be in electronic communication with the first stage 101 and the second stage 102. The processor 109 can be configured to send instructions for movement of the first stage 101 and the second stage 102. The first stage 101 and second stage 102 can move relative to each other. The processor 102 can be in electronic communication with one or more X-direction actuators, Y-direction actuators, Z-direction actuators, position feedback sensors, and/or laser interferometers in the second stage 102. The processor 109 may include a microprocessor, a microcontroller, or other devices. The processor 109 can provide instructions to one or more amplifiers. The amplifiers can deliver the desired current and voltage based on position error.

The processor 109 may be coupled to the components of the system 100 in any suitable manner (e.g., via one or more transmission media, which may include wired and/or wireless transmission media) such that the processor 109 can receive output. The processor 109 may be configured to perform a number of functions using the output. The system 100 can receive instructions or other information from the processor 109.

The processor 109, other system(s), or other subsystem(s) described herein may be part of various systems, including a personal computer system, image computer, mainframe computer system, workstation, network appliance, interne appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 109 may be disposed in or otherwise part of the system 100 or another device. In an example, the processor 109 may be part of a standalone control unit or in a centralized quality control unit. Multiple processors 109 may be used.

The processor 109 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 109 to implement various methods and functions may be stored in readable storage media.

The processor 109 may be configured to perform a number of functions using the output of the system 100 or other output. For instance, the processor 109 may be configured to send the output to an electronic data storage unit or another storage medium. The processor 109 may be further configured as described herein.

The processor 109 may be configured according to any of the embodiments described herein. The processor 109 also may be configured to perform other functions or additional steps using the output of the system 100 or using images or data from other sources.

The processor 109 may be communicatively coupled to any of the various components or sub-systems of system 100 in any manner known in the art. Moreover, the processor 109 may be configured to receive and/or acquire data or information from other systems by a transmission medium that may include wired and/or wireless portions. In this manner, the transmission medium may serve as a data link between the processor 109 and other subsystems of the system 100 or systems external to system 100.

Various steps, functions, and/or operations of system 100 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 109 or, alternatively, multiple processors 109. Moreover, different subsystems of the system 100 may include one or more computing or logic systems. Therefore, the above description should not be interpreted as a limitation on the present disclosure but merely an illustration.

Umbilical feeds (not illustrated) can provide power to the second stage 102.

Figure 2:
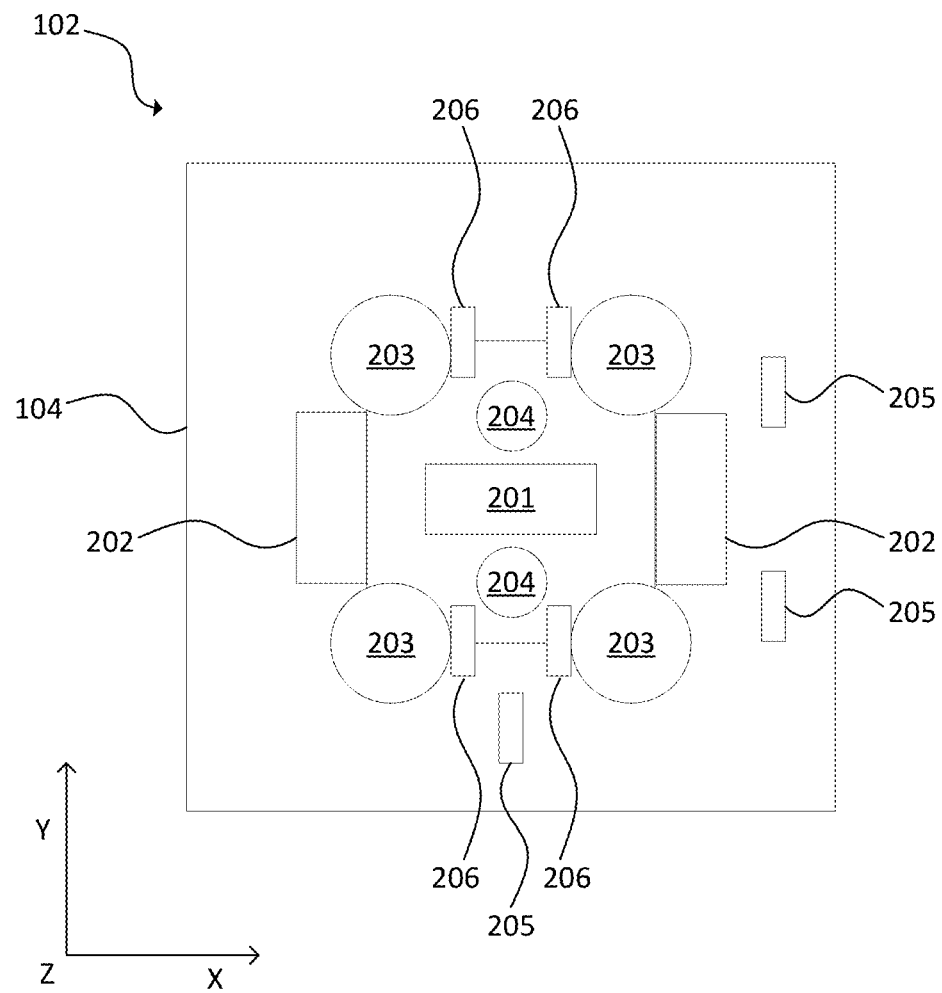
FIG. 2 is a bottom view of the second stage in accordance with the present disclosure.

FIG. 2 is a bottom view of the second stage 102. The base 103 includes actuators to move the second stage 102. At least one X-direction actuator 201, at least one Y-direction actuator 202, and/or at least one Z-direction actuator 203 are included. The X-direction actuator 201, Y-direction actuators 202, and Z-direction actuators 203 are disposed on the second stage 102. The X-direction actuator 201 can move the second stage 102 in the X-direction. The Y-direction actuator 202 can move the second stage 102 in the Y-direction. The Z-direction actuator 203 can move the second stage 102 in the Z-direction.

In an instance, each of the Z-direction actuators 203 is disposed in a recess of the first stage 101.

The X-direction actuator 201, Y-direction actuator 202, and Z-direction actuator 203 can be a linear motor, rotary-driving ball screw linear motor, piezo linear motor, electromagnetic actuator, voice coil actuator, an array of magnets and coil arrangement, or other types of actuators or motors. The voice coil actuator can include a magnet assembly mounted to the second stage 102, a coil collected to the top of the first stage 101 that pushes the magnet assembly away, and a gap between the coil and magnet assembly to allow fine movements. A linear motor can include a magnet assembly mounted to the second stage 102 or the top of the first stage 101, a coil that pushes away from the magnet assembly connected to the other of the second stage 102 or top of the first stage 101, and a gap between the coil and magnet assembly to allow fine movements.

In an instance, the Z-direction actuators 203 are voice coil actuators and the X-direction actuator 201 and Y-direction actuator 202 are linear motors.

The X-direction actuator 201 and/or Y-direction actuator 202 may provide a controlled force such that a desired position is maintained or obtained between the chuck 105 relative to an optical head of the semiconductor inspection system 107. The X-direction actuator 201 and/or Y-direction actuator 202 also can provide a safety gap between the first stage 101 and second stage 102. For example, non-contact actuators can have a coil and magnet with a gap between them, which can be the maximum travel of the second stage 102.

In the embodiment of FIG. 2, there is one X-direction actuator 201, two Y-direction actuators 202, and four Z-direction actuators 203. Different numbers or combinations of actuators are possible.

There can be at least one counterbalance spring 204 disposed between the second stage 102 and the first stage 101 to compensate for the weight of the second stage 102. The counterbalance spring 204 is illustrated in FIG. 2 as disposed on the second stage 102. The counterbalance spring 204 can be magnetic spring, a compression spring, or fixed force motor. One side of the counterbalance spring 204 can be connected to a top surface of the first stage 101 and the other side of the counterbalance spring 204 can be connected to an opposite bottom surface of the second stage 102.

Horizontal position feedback sensors 205 are disposed on the second stage 102. The horizontal position feedback sensors 205 can include a sensor and a target, one of which is mounted on the second stage 102 and the other of which is mounted on first stage 101. The horizontal position feedback sensors 205 can control the safety gap between the second stage 102 and first stage 101 and also can be used as a second control loop in the total control of the second stage 102 relative to the optical head in the semiconductor inspection system 107.

Vertical position feedback sensors 206 are disposed on the second stage 102. In an instance, the vertical position feedback sensors 206 are disposed on or in one or more of the Z-direction actuators 203. For example, a vertical position feedback sensor 206 can be disposed on or in all the Z-direction actuators 203.

The horizontal position feedback sensors 205 or vertical position feedback sensor 206 may each be a capacitive sensor or eddy current sensor. A capacitive sensor can include a sensor head mounted to either the first stage 101 or second stage 102 and a target mounted to the other of the first stage 101 or second stage 102. The sensor head can include a guard, sensing area, and body. Capacitive sensors can provide resolution up to a nanometer level.

An eddy current sensor can include a sensor head mounted to either the first stage 101 or second stage 102 and a target mounted to the other of the first stage 101 or second stage 102. The sensor head includes a sending coil and receiving coil. Sub-micro resolution is possible with an eddy current sensor.

In an embodiment, the system 100 includes four vertical position feedback sensors 206. The system 100 can use six sensors during operation. This can include three sensors for Z-direction movement, tip, and tilt. This also can include three sensors for X-direction movement, Y-direction movement, and rotation.

Using the design disclosed herein, the second stage 102 can provide fast fine X-direction, Y-direction, Z-direction, pitch, roll, and rotation movement that can cancel and compensate for noise from the system and/or first stage 101.

The system 100 can be deployed in high vacuum tools like electron beam and reticle inspection tools.

The processor 109 can monitor two feedback systems: coarse sensors and at least one laser interferometer for the fine stage relative to the optical head of the semiconductor inspection system 107. The processor 109 can command movement of the first stage 101, which can be at high speeds and can include long travel distances, and the second stage 102 with its more limited travel. The second stage 102 can provide the final fast setting position when stopped or can keep the desired jitter during constant velocity scan. The processor 109 can have a nested servo loop where the inner loop is the coarse feedback and the outer loop is the position error loop of optical head of the semiconductor inspection system 107 to the chuck 105. These servo loops can be in all six DOF.

The proposed six DOF second stage 102 can operate without any guide bearing system and can contain a nested frame driven by actuators and feedback devices to create the X-direction, Y-direction, and yaw motion. The nested frame of the second stage can be disposed on the first stage 101. The second stage 102 can be driven by three or more actuators with feedback devices.

In an instance, the Z center hub is mounted on the first stage 101 and the driving actuators and second loop feedback sensors are mounted on the main external static plate. The Z-direction actuators 203 can carry the weight of the second stage 101.

The second stage 102 can operate without any guide bearing or flexures. The various actuators can push the payload (e.g., the chuck 105) while holding position using feedback sensors. The second stage 102 can move short travel in the Z-direction, tip, and tilt and can move in the X-direction, Y-direction, and yaw.

In an instance, the second stage 102 can be positioned on an X, Y bridge.

Figure 3:
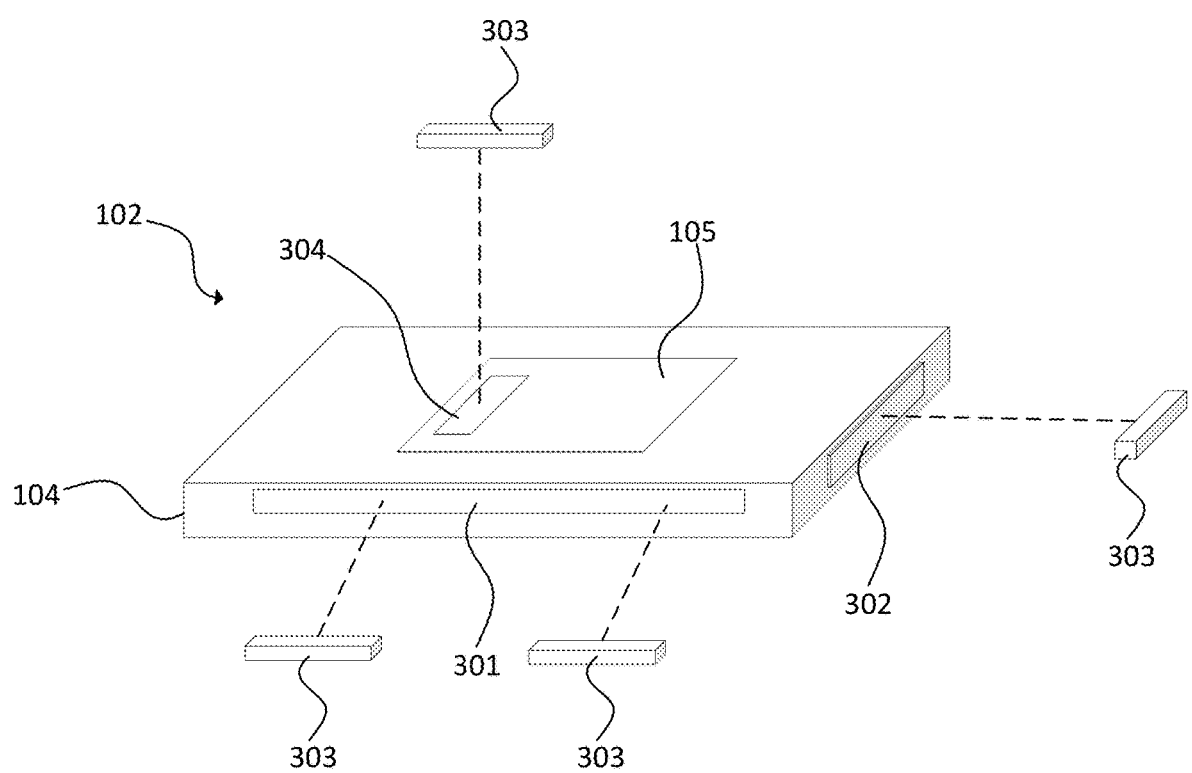
FIG. 3 is a perspective side view of the second stage in accordance with the present disclosure.

FIG. 3 is a perspective side view of the second stage 102. A first interferometer mirror 301 and second interferometer mirror 302 are disposed on edges of the frame 104 of the second stage 102. The first interferometer mirror 301 and second interferometer mirror 302 are disposed on perpendicular edges of the frame 104 of the second stage 102.

At least two laser interferometers 303 direct a laser (represented by the dotted line) at one of the first interferometer mirror 301 or second interferometer mirror 302. For example, three laser interferometers 303 may be used.

At least one laser interferometer beam can be used to measure movement in the Z-direction. At least two laser interferometer beams can be used to measure movement in the X-direction, Y-direction, tip, tilt, pitch, and yaw. These can be a differential beam arrangement to provide accurate feedback of the chuck 105 relative to the optical head in the semiconductor inspection system 107 in real time for all six DOF. The optical head may have some motion by itself from vibration, which can be followed.

A short-stroke, high-bandwidth, unguided second stage 102 with six DOF and laser interferometers can allow real-time vibration cancelation and improved settling time.

While laser interferometers are specifically disclosed, external grid encoder plates feedback sensors also can be used.

A feedback loop can be combination of internal position feedback (such as cap sensors, encoders, etc.) and external laser interferometer beams pointing to the second stage 102 for fine and accurate position feedback. The laser beams can be referenced to the scanning optics and provide differential feedback between the second stage 102 and inspection optics. The position feedback control loop for the second stage 102 can keep the real chuck position relative to an optical inspection head in the semiconductor inspection system 107.

Two laser beams positioned vertically or parallel to each other (such as with the first interferometer mirror 301) can determine pitch, yaw, or roll by calculating the difference between the two laser beams.

An optional laser beam aimed at, for example, the chuck 105 can be used to determine Z-direction movement or position. The chuck 105 can include an optional third interferometer mirror 304 to provide these measurements.

Sensors disclosed herein can be used to determine how far the center of the second stage 102 is from the center of the first stage 101. Measuring this relative position can avoid use of hard stops.

Moving the second stage 102, which includes the chuck 105, without any bearing mechanism can create less vibration, less heat, and can settle to position faster. The second stage 102 can receive the position feedback from laser interferometer or encoder grid plate pointing to the chuck mirror in all degrees of freedom. The second stage 102 also can have position sensors to be in a second control loop.

Higher throughput and lower vibration is possible with the embodiments disclosed herein. The embodiments disclosed herein also can provide sensitivity in high vacuum systems where a laser interferometer can be used as a chuck position feedback. It can also be used in an atmosphere application if an external six DOF encoder system (not mounted on the stage) can be used as a feedback.

Figure 5:
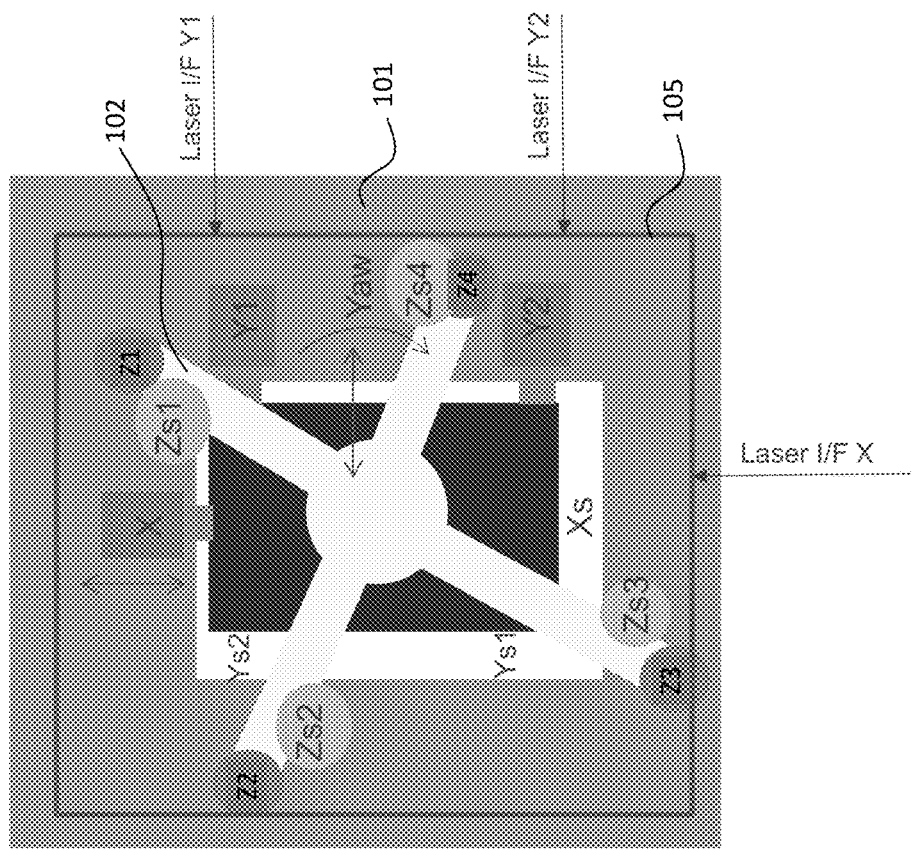
FIG. 5 includes various corresponding views of an embodiment of a system in accordance with the present disclosure.
Figure 5:
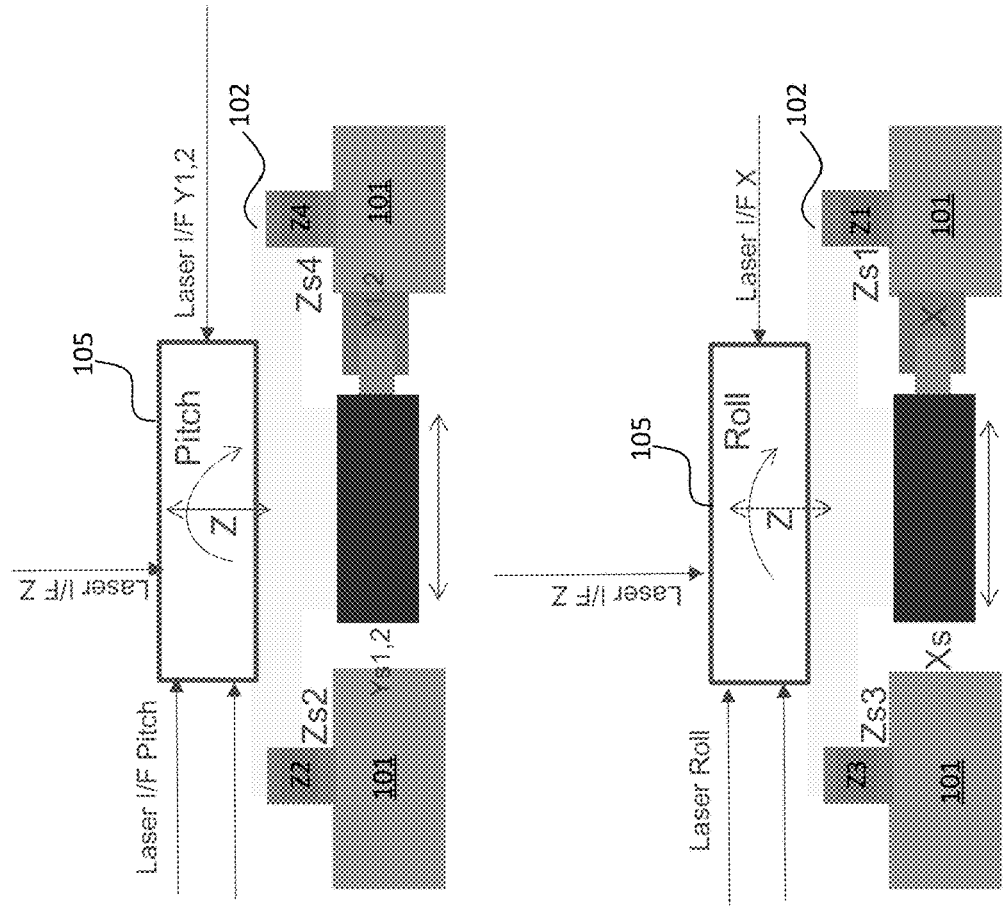

FIG. 5 includes various corresponding views of an embodiment of a system, such as system 100. The laser interferometer (I/F) beams and other sensors can provide measurements in the X-direction, Y-direction, Z-direction, pitch, roll, and yaw. X, Y1, Y2, Z1, Z2, Z3, and Z4 in FIG. 5 represent actuators that move in the direction indicated in their abbreviated names. Xs, Ys1, Ys2, Zs1, Zs2, Zs3, and Zs4 in FIG. 5 are position sensors for measuring in the direction indicated in their abbreviated names. Thus, X is an actuator that moves in the X-direction, Y2 is an actuator that moves in the Y-direction, and Zs2 is a position sensor that measures movement in the Z-direction.

Figure 4:
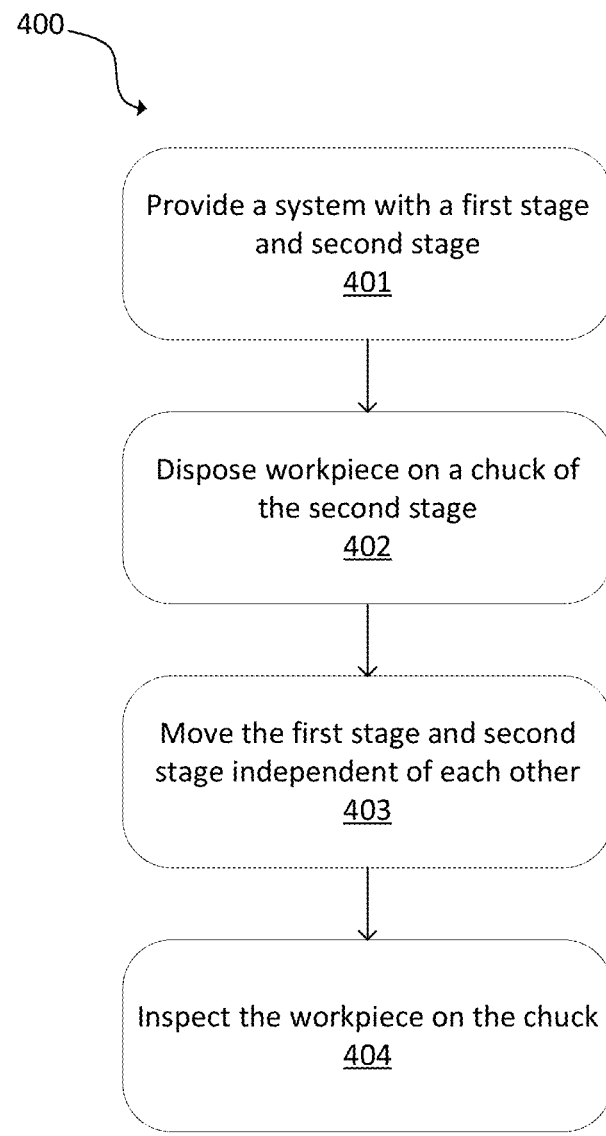
FIG. 4 is a flowchart of a method in accordance with the present disclosure.

FIG. 4 is a flowchart of a method 400. At 401, a system is provided. The system includes a first stage, a second stage disposed on the first stage, and a chuck disposed on the second stage. The first stage is configured to move in at least an X-direction and a perpendicular Y-direction. The second stage provides six degrees of freedom. For example, the system 100 can be provided.

A workpiece is disposed on the chuck at 402. The workpiece may be a semiconductor wafer or a reticle. The first stage and the second stage are moved independent of each other at 403. The movement of the first stage and the second stage can be coordinated so the workpiece is positioned at, maintained at, or scanned to a desired location for inspection relative to the semiconductor inspection system. A processor can send instructions to move the first stage and/or second stage. The workpiece on the chuck is inspected at 404.

Moving the second stage can include moving the second stage in the X-direction using at least one X-direction actuator disposed on the second stage, moving the second stage in the Y-direction using at least one Y-direction actuator disposed on the second stage, and/or moving the second stage in a Z-direction using at least one Z-direction actuator disposed on the second stage.

A position of the second stage can be determined in the X-direction and/or Y-direction using a laser interferometer. The laser is directed at a mirror disposed on the second stage. A position of the second stage in a Z-direction can be determined using a vertical position feedback sensor disposed on the second stage.

An additional embodiment relates to a non-transitory computer-readable medium storing program instructions executable on a processor for performing a computer-implemented method for moving the first stage and/or second stage, as disclosed herein. An electronic data storage unit or other storage medium may contain non-transitory computer-readable medium that includes program instructions executable on the processor 109. The computer-implemented method may include any step(s) of any method(s) described herein.

Program instructions implementing methods such as those described herein may be stored on computer-readable medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
a first stage configured to move in at least an X-direction and a perpendicular Y-direction;
a second stage disposed on the first stage, wherein the second stage provides six degrees of freedom;
a chuck disposed on the second stage, wherein the chuck is configured to hold a workpiece;
at least one X-direction actuator configured to move the second stage in the X-direction, wherein the X-direction actuator is disposed on the second stage;
at least one Y-direction actuator configured to move the second stage in the Y-direction, wherein the Y-direction actuator is disposed on the second stage;
at least one Z-direction actuator configured to move the second stage in a Z-direction, wherein the Z-direction actuator is disposed on the second stage, and wherein the Z-direction is perpendicular to both the X-direction and the Y-direction;
two interferometer mirrors disposed on perpendicular edges of the second stage;
at least one vertical position feedback sensor disposed on the second stage; and
at least one counterbalance spring between the first stage and the second stage.

2. The system of claim 1, wherein the first stage has a wider range of movement than the second stage.

3. The system of claim 1, wherein the system includes four of the Z-direction actuators disposed on the second stage.

4. The system of claim 1, wherein the system includes two of the Y-direction actuators disposed on the second stage.

5. The system of claim 1, further comprising a base plate, wherein the first stage is disposed on the base plate.

6. The system of claim 1, further comprising two laser interferometers, wherein each of the laser interferometers directs a laser at one of the interferometer mirrors.

7. The system of claim 1, wherein the workpiece is a semiconductor wafer or a reticle.

8. The system of claim 1, further comprising a semiconductor inspection system configured to direct a beam at the chuck.

9. The system of claim 1, further comprising a processor configured to send instructions for movement of the first stage and the second stage relative to each other, wherein the processor is in electronic communication with the X-direction actuator, the Y-direction actuator, the Z-direction actuator, and the vertical position feedback sensor.

10. A method comprising:
providing a system that includes a first stage, a second stage disposed on the first stage, and a chuck disposed on the second stage, wherein the first stage is configured to move in at least an X-direction and a perpendicular Y-direction, and wherein the second stage provides six degrees of freedom;
disposing a workpiece on the chuck, wherein the workpiece is a semiconductor wafer or a reticle;
moving the first stage and the second stage independent of each other, wherein moving the second stage includes moving the second stage in the X-direction using at least one X-direction actuator disposed on the second stage; and
inspecting the workpiece on the chuck.

11. The method of claim 10, wherein moving the second stage further includes moving the second stage in the Y-direction using at least one Y-direction actuator disposed on the second stage.

12. The method of claim 10, wherein moving the second stage further includes moving the second stage in a Z-direction using at least one Z-direction actuator disposed on the second stage, and wherein the Z-direction is perpendicular to both the X-direction and the Y-direction.

13. The method of claim 10, further comprising determining a position of the second stage in the X-direction using a laser interferometer, wherein the laser is directed at a mirror disposed on the second stage.

14. The method of claim 10, further comprising determining a position of the second stage in the Y-direction using a laser interferometer, wherein the laser is directed at a mirror disposed on the second stage.

15. The method of claim 10, further comprising determining a position of the second stage in a Z-direction using a vertical position feedback sensor disposed on the second stage.

16. The method of claim 10, further comprising, using a processor, sending instructions for the moving.

* * * * *